US012567622B2

(12) United States Patent
Xiao et al.

(10) Patent No.: US 12,567,622 B2
(45) Date of Patent: Mar. 3, 2026

(54) ENERGY STORAGE BATTERY SYSTEM AND CONTROL METHOD OF BATTERY THERMAL RUNAWAY

(71) Applicants: Microvast Power Systems Co., Ltd., Huzhou (CN); Microvast, Inc., Stafford, TX (US)

(72) Inventors: Ningqiang Xiao, Huzhou (CN); Heng Zhao, Huzhou (CN); Wenjuan Liu Mattis, Longwood, FL (US); Shengxian Wu, Huzhou (CN); Guoyou Deng, Huzhou (CN)

(73) Assignees: MICROVAST POWER SYSTEMS CO., LTD., Huzhou (CN); MICROVAST, INC., Stafford, TX (US)

( * ) Notice: Subject to any disclaimer, the term of this patent is extended or adjusted under 35 U.S.C. 154(b) by 718 days.

(21) Appl. No.: 17/893,210

(22) Filed: Aug. 23, 2022

(65) Prior Publication Data

US 2024/0072333 A1 Feb. 29, 2024

(51) Int. Cl.
| | |
|---|---|
| *H01M 10/6568* | (2014.01) |
| *H01M 10/48* | (2006.01) |
| *H01M 10/613* | (2014.01) |
| *H01M 50/317* | (2021.01) |
| *H01M 50/383* | (2021.01) |
| *H01M 50/505* | (2021.01) |

(52) U.S. Cl.
CPC ..... *H01M 10/6568* (2015.04); *H01M 10/482* (2013.01); *H01M 10/486* (2013.01); *H01M 10/613* (2015.04); *H01M 50/317* (2021.01); *H01M 50/383* (2021.01); *H01M 50/505* (2021.01)

(58) Field of Classification Search
CPC ........... H01M 10/6568; H01M 10/482; H01M 10/486; H01M 10/613; H01M 50/317; H01M 50/383; H01M 50/505; H01M 10/625; H01M 10/6567; H01M 50/209; Y02E 60/10
See application file for complete search history.

(56) References Cited

U.S. PATENT DOCUMENTS

2013/0171480 A1* 7/2013 Englert ............... H01M 10/486
429/61

FOREIGN PATENT DOCUMENTS

| CN | 103985921 | * | 8/2014 |
|---|---|---|---|
| CN | 106110537 | * | 11/2016 |
| JP | 20160-98033 | * | 6/2018 |

* cited by examiner

*Primary Examiner* — Lisa S Park
(74) *Attorney, Agent, or Firm* — Andrew C. Cheng

(57) ABSTRACT

The disclosure provides an energy storage battery system, including a battery cluster and a first communicating unit. The battery cluster includes at least one battery module, and the battery module includes at least one battery cell. The first communicating unit is used to connect with a high-pressure pump, and external cooling fluid can be pressurized by the high-pressure pump and transmitted to the first communicating unit to cause the first communicating unit to burst, and after the first communicating unit bursts, the cooling fluid is sprayed to the battery cell. The disclosure further provides a control method of battery thermal runaway.

15 Claims, 5 Drawing Sheets

ENERGY STORAGE BATTERY SYSTEM AND CONTROL METHOD OF BATTERY THERMAL RUNAWAY

TECHNICAL FIELD

The present disclosure relates to the technical field of batteries, and in particular, to an energy storage battery system and a control method of battery thermal runaway.

BACKGROUND OF THE DISCLOSURE

With the development of electronic technology, lithium-ion batteries have been widely used because of their high specific power, long cycle life, good safety performance and less pollution. Thermal runaway is an important concern in lithium-ion battery design. When thermal runaway occurs in the battery, it will cause high temperature, smoke, fire and even explosion in a short time, which is extremely dangerous. Especially in large-scale energy storage systems, the thermal runaway of a single battery may cause a chain reaction and eventually cause huge losses.

Battery thermal runaway generally goes through the following four stages:

(1). The battery cell is damaged, and the temperature and pressure of the battery cell rise;

(2). With the rise of temperature and pressure of the battery cell, flammable gas is produced and discharged from the battery cell;

(3). The temperature of the battery cell rises rapidly, and a thermal runaway occurs in the battery cell. The heat of the battery cell with thermal runaway is quickly transferred to other adjacent battery cells, resulting in the risk of thermal runaway of other battery cells;

(4). The battery cell starts to catch fire after the heat is out of control, and the fire will quickly spread to adjacent battery cells and structural materials, and become uncontrollable.

The earlier the battery problem is detected in these four stages, the easier it is to quickly control the risk, and the less the loss will be caused. At present, the mainstream energy storage system generally controls the thermal runaway in the fourth stage: the energy storage system is equipped with a fire-suppression system, which includes a smoke alarm device and a gas fire-extinguishing system. Only after the thermal runaway occurs and fire is generated, the smoke alarm device detects the smoke of the fire and then triggers the command, so that the gas fire-extinguishing system begins to extinguish the fire. Therefore, the existing fire-suppression system intervenes too late in the event of thermal runaway, with poor effect and incomplete fire extinguishing, and even causes a larger fire.

SUMMARY OF THE DISCLOSURE

The object of present disclosure is to provide an energy storage battery system and a control method of battery thermal runaway, which can identify the different levels of thermal runaway of the battery cell and take hierarchical treatments for the different levels of thermal runaway, so as to quickly and efficiently control the battery cell with thermal runaway and minimize the influence range of the thermal runaway.

An embodiment of the disclosure provides an energy storage battery system, which includes a battery cluster and a first communicating unit. The battery cluster includes at least one battery module, and the battery module includes at least one battery cell. The first communicating unit is configured to connect with a high-pressure pump, and external cooling fluid can be pressurized by the high-pressure pump and transmitted to the first communicating unit to cause the first communicating unit to burst, and after the first communicating unit bursts, the cooling fluid is sprayed to the battery cell.

In a realizable way, the energy storage battery system further includes a second communicating unit, the first communicating unit and the second communicating unit are both communicated with the battery cell; the second communicating unit is configured to connect with a low-pressure pump, and external cooling fluid can be transmitted to an interior of the battery cell using the low-pressure pump.

In a realizable way, the first communicating unit is arranged on the top of the battery cell, and the first communicating unit is communicated with the top of the battery cell; the second communicating unit is arranged on the bottom of the battery cell, and the second communicating unit is communicated with the bottom of the battery cell.

In a realizable way, the first communicating unit includes a first main pipe and a cell discharge pipe, the first main pipe is configured to connect with the high-pressure pump, and the battery cell is communicated with the first main pipe through the cell discharge pipe; a pressurizing pressure of the high-pressure pump is greater than a bursting pressure of the cell discharge pipe, and the cooling fluid can be pressurized through the high-pressure pump and transmitted to the cell discharge pipe through the first main pipe to cause the cell discharge pipe to burst, and the cooling fluid is sprayed to the battery cell after the cell discharge pipe bursts.

In a realizable way, the pressure resistant performance of the cell discharge pipe decreases with the increase of temperature of the cell discharge pipe.

In a realizable way, the high-pressure pump is connected with one end of the first main pipe. In a realizable way, the end of the first main pipe adjacent to the high-pressure pump is provided with a first solenoid valve.

In a realizable way, the first main pipe is provided with a pressure sensor.

In a realizable way, a fire hood and a pressure relief valve are arranged above the battery cell, and the fire hood covers the cell discharge pipe and the pressure relief valve.

In a realizable way, the second communicating unit includes a second main pipe and a cell inlet pipe, the second main pipe is configured to connect with the low-pressure pump, and the battery cell is communicated with the second main pipe through the cell inlet pipe.

In a realizable way, the low-pressure pump is connected with one end of the second main pipe. In a realizable way, the end of the second main pipe adjacent to the low-pressure pump is provided with a third solenoid valve.

In a realizable way, the first main pipe and the cell discharge pipe are both arranged on the top of the battery cell, and the cell discharge pipe is communicated with the top of the battery cell; the second main pipe and the cell inlet pipe are both arranged on the bottom of the battery cell, and the cell inlet pipe is communicated with the bottom of the battery cell.

In a realizable way, at least a portion of the cell inlet pipe is a hose, and/or at least a portion of the cell discharge pipe is a hose.

In a realizable way, a one-way valve is arranged on the cell inlet pipe and/or the cell discharge pipe.

In a realizable way, the one-way valve is a one-way solenoid valve.

In a realizable way, the battery module includes a plurality of battery cells; the first communicating unit further includes a first branch pipe, and the second communicating unit further includes a second branch pipe; the cell discharge pipes on the plurality of battery cells are first summarized to the first branch pipe and then communicated to the first main pipe through the first branch pipe, and the cell inlet pipes on the plurality of battery cells are first summarized to the second branch pipe and then communicated to the second main pipe through the second branch pipe.

In a realizable way, a composite sensor is arranged on the top of the battery cluster.

In a realizable way, the battery cluster further includes a busbar connected with the battery cell, and the busbar is provided with a temperature sensor.

Another embodiment of the disclosure provides a control method of battery thermal runaway applied to an energy storage battery system. The energy storage battery system includes at least one battery cell, a first communicating unit and a second communicating unit, the first communicating unit and the second communicating unit are both communicated with the battery cell; the first communicating unit is connected with a high-pressure pump, and the second communicating unit is connected with a low-pressure pump; the control method includes:

when a first level of thermal runaway occurs in the battery cell, opening the low-pressure pump, using the low-pressure pump to inject cooling fluid into the battery cell through the second communicating unit;

when a second level of thermal runaway occurs in the battery cell, opening the high-pressure pump and the low-pressure pump, using the high-pressure pump to pressurize external cooling fluid and transmit it to the first communicating unit to cause the first communicating unit to burst, and spray the cooling fluid to the battery cell after the first communicating unit bursts, and simultaneously, using the low-pressure pump to inject cooling fluid into the battery cell through the second communicating unit.

In a realizable way, the first communicating unit includes a first main pipe and a cell discharge pipe, the battery cell is communicated with the first main pipe through the cell discharge pipe, and one end of the first main pipe is connected with the high-pressure pump;

when the second level of thermal runaway occurs in the battery cell, using the high-pressure pump to pressurize the cooling fluid and transmit it to the cell discharge pipe through the first main pipe such that a pressure of the cooling fluid in the cell discharge pipe is greater than a bursting pressure of the cell discharge pipe, and the cooling fluid is sprayed to the battery cell after the cell discharge pipe bursts.

In a realizable way, the battery cluster further includes a busbar connected with the battery cell, the busbar is provided with a temperature sensor; the first main pipe is provided with a pressure sensor, and the top of the battery cluster is provided with a composite sensor;

when the pressure sensor detects that the pressure and/or the rate of pressure rise in the first main pipe reaches a preset value, and the temperature sensor detects that the temperature and/or the rate of temperature rise of the busbar reaches a preset value, it is considered that the first level of thermal runaway occurs in the battery cell;

when the composite sensor detects gas generated by the thermal runaway of the battery cell, it is considered that the second level of thermal runaway occurs in the battery cell.

In a realizable way, a fire hood and a pressure relief valve are arranged above the battery cell, the first communicating unit is arranged on the top of the battery cell, the fire hood covers the first communicating unit and the pressure relief valve; the control method further includes:

when the second level of thermal runaway occurs in the battery cell, using the fire hood to control the leaked gas or the ejected flame of the battery cell within the area where the fire hood is located, and using the fire hood to control the direction of the cooling fluid sprayed by the first communicating unit, such that the cooling fluid is sprayed downward from the top of the battery cell.

In the energy storage battery system provided by the present disclosure, by setting a first communicating unit and connecting the first communicating unit with a high-pressure pump, after thermal runaway occurs in the battery cell, external cooling fluid is pressurized by the high-pressure pump and transmitted to the first communicating unit to cause the first communicating unit to burst, and after the first communicating unit bursts, the cooling fluid is sprayed to the battery cell, so as to continuously cool the battery cell, effectively suppress the further expansion of thermal runaway, and try to reduce the influence range of thermal runaway.

Figure 1:
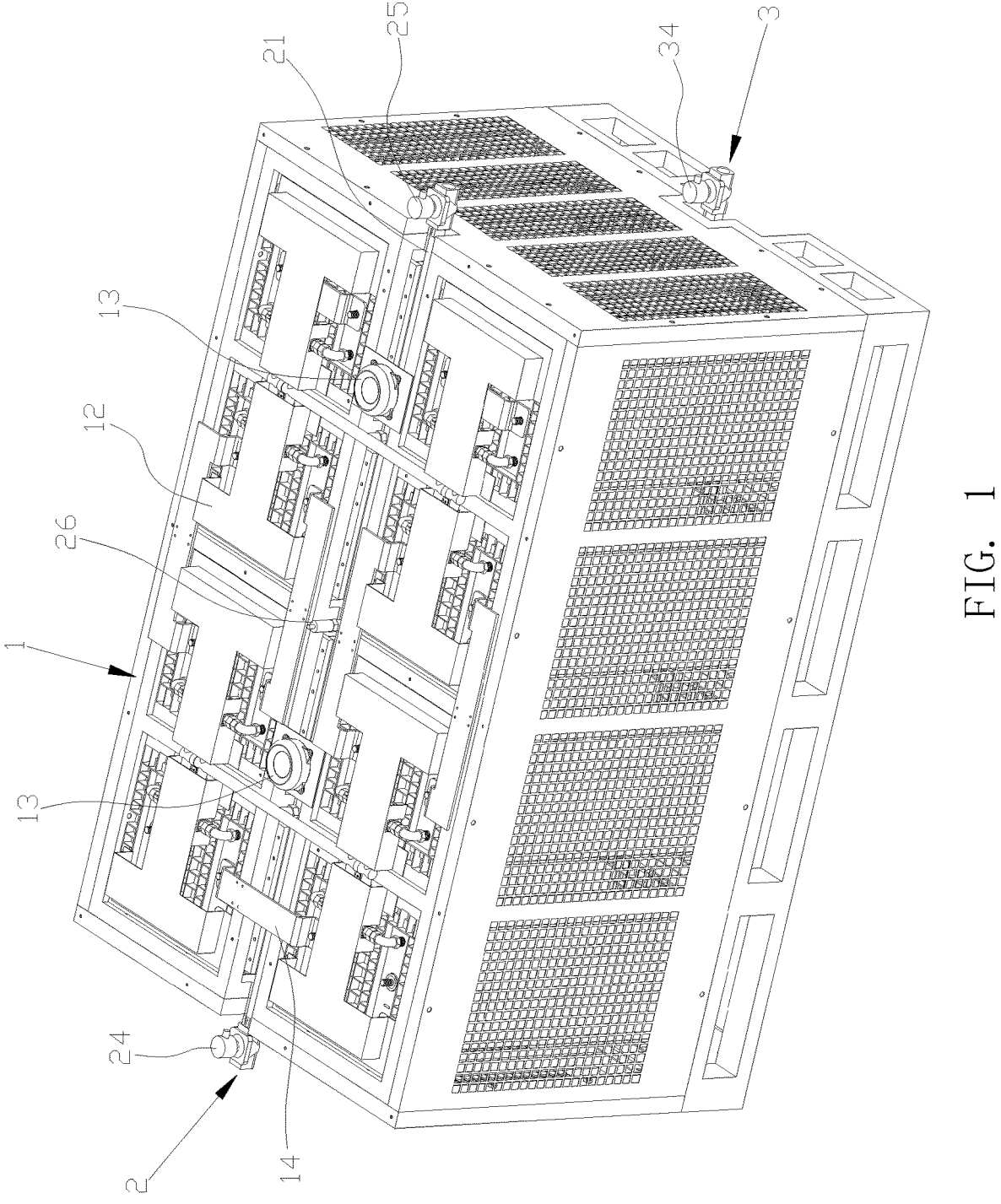
FIG. 1 is a schematic view showing the three-dimensional structure of the energy storage battery system in the embodiment of the disclosure.

In the drawings: 1—battery cluster, 11—battery module, 111—battery cell, 112—pressure relief valve, 12—fire hood, 13—composite sensor, 14—busbar, 15—temperature sensor, 2—first communicating unit, 21—first main pipe, 22—cell discharge pipe, 23—first branch pipe, 24—first solenoid valve, 25—second solenoid valve, 26—pressure sensor, 27—one-way valve, 3—second communicating unit, 31—second main pipe, 32—cell inlet pipe, 33—second branch pipe, 34—third solenoid valve, 4—air extraction device, 5—low pressure pump, 6—high pressure pump.

DETAILED DESCRIPTION OF PREFERRED EMBODIMENTS

Specific embodiments of the present disclosure will be described in further detail below in conjunction with the accompanying drawings. The following embodiments are used to illustrate the present disclosure, but are not used to limit the scope of the present disclosure.

The terms "first", "second", "third", "fourth" and the like (if any) involved in the description and claims of the present disclosure are used to distinguish similar objects, and are not used to describe a specific order or sequence.

The spatial terms "up", "down", "left", "right", "front", "back", "top", "bottom" and the like (if any) involved in the description and claims of the present disclosure are defined by the positions of the structures in the figures and the positions between the structures, for the clarity and convenience of expressing the technical solution. It should be understood that the use of these spatial terms should not limit the scope of the present disclosure.

As shown in FIGS. 1 to 5, the energy storage battery system provided in the embodiment of the disclosure includes a battery cluster 1, a first communicating unit 2 and a second communicating unit 3. The battery cluster 1 includes at least one battery module 11, and the battery module 11 includes at least one battery cell 111. The first communicating unit 2 and the second communicating unit 3 are both communicated with the battery cell 111. The first communicating unit 2 is used to connect with a high-pressure pump 6, and external cooling fluid can be pressurized through the high-pressure pump 6 and transmitted to the first communicating unit 2 to cause the first communicating unit 2 to burst. After the first communicating unit 2 bursts, the cooling fluid is sprayed to the battery cell 111. The second communicating unit 3 is used to connect with a low-pressure pump 5, and external cooling fluid can be transmitted to an interior of the battery cell 111 using the low-pressure pump 5.

Further, the first communicating unit 2 is also used to connect with an air extraction device 4, and the gas in the battery cell 111 and the first communicating unit 2 can be extracted using the air extraction device 4, so as to reduce the pressure in the battery cell 111 and the pipeline and the concentration of combustible gas.

Specifically, the energy storage battery system provided in this embodiment is provided with a first communicating unit 2 and a second communicating unit 3 both of which are communicated with the battery cell 111, the first communicating unit 2 is connected to the high-pressure pump 6, and the second communicating unit 3 is connected to the low-pressure pump 5. After the first level of thermal runaway occurs in the battery cell 111, the low-pressure pump 5 is used to inject cooling fluid into the battery cell 111 to continuously cool the battery cell 111, so as to effectively suppress the further expansion of thermal runaway during the first level of thermal runaway in the battery cell 111, control the thermal runaway at the minimal cost, and try to reduce the influence range of thermal runaway. When the second level of thermal runaway (i.e., severe thermal runaway) occurs in the battery cell 111, the high-pressure pump 6 pressurizes the cooling fluid and transmits it to the first communicating unit 2. Since the pressure of the cooling fluid is greater than the pressure-bearing range of the first communicating unit 2 (that is, greater than the bursting pressure of the first communicating unit 2), the first communicating unit 2 bursts and sprays the cooling fluid to the battery cell 111 to extinguish the fire and cool the battery cell 111, so as to prevent further occurrence of thermal runaway.

As shown in FIGS. 1 to 4, in an embodiment, the first communicating unit 2 is arranged on the top of the battery cell 111, and the first communicating unit 2 is communicated with the top of the battery cell 111. The second communicating unit 3 is arranged on the bottom of the battery cell 111, and the second communicating unit 3 is communicated with the bottom of the battery cell 111.

Figure 2:
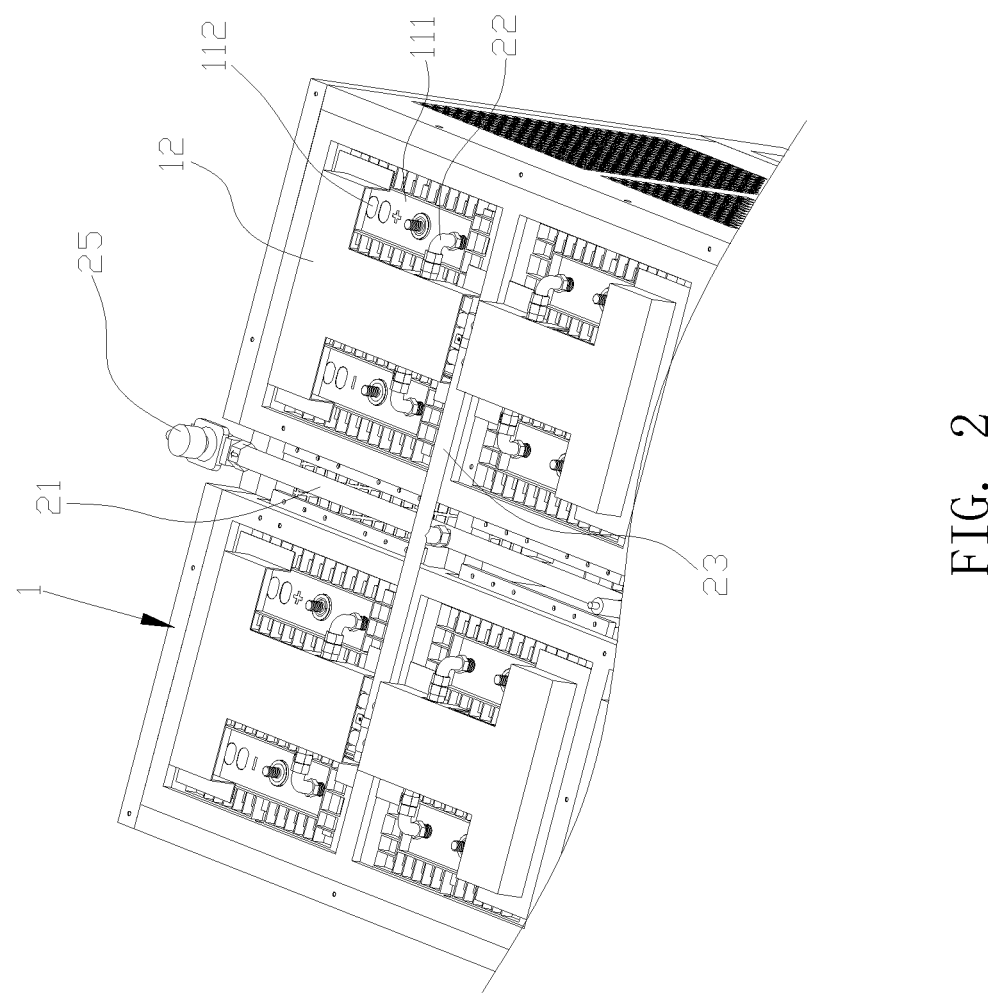
FIG. 2 is a schematic view showing the layout structure of the fire hood in FIG. 1.

As shown in FIGS. 1 and 2, in an embodiment, the first communicating unit 2 includes a first main pipe 21 and a cell discharge pipe 22. The first main pipe 21 is used to connect with the high-pressure pump 6 and the air extraction device 4. The cell discharge pipe 22 is arranged adjacent to the battery cell 111, and the battery cell 111 is communicated with the first main pipe 21 through the cell discharge pipe 22. The pressurizing pressure of the high-pressure pump 6 is greater than the bursting pressure of the cell discharge pipe 22. Thus, the cooling fluid can be pressurized through the high-pressure pump 6 and transmitted to the cell discharge pipe 22 through the first main pipe 21 to cause the cell discharge pipe 22 to burst. After the cell discharge pipe 22 bursts, the cooling fluid is sprayed to the battery cell 111. The temperature resistance and explosion-proof performance of the cell discharge pipe 22 is far lower than that of the first main pipe 21. After the thermal runaway occurs in the battery cell 111, the cell discharge pipe 22 bursts, but the first main pipe 21 does not burst. The high-pressure pump 6 can continuously deliver cooling fluid through the first main pipe 21 to the cell discharge pipe 22 for the battery cell 111 with thermal runaway, so as to directionally and continuously cool the battery cell 111 and reduce the impact on other normal battery cells 111.

In an embodiment, the pressure resistant performance of the cell discharge pipe 22 decreases with the increase of temperature of the cell discharge pipe 22, so that the cell discharge pipe 22 is more prone to bursting in the high-temperature environment after the thermal runaway occurs in the battery cell 111.

Figure 5:
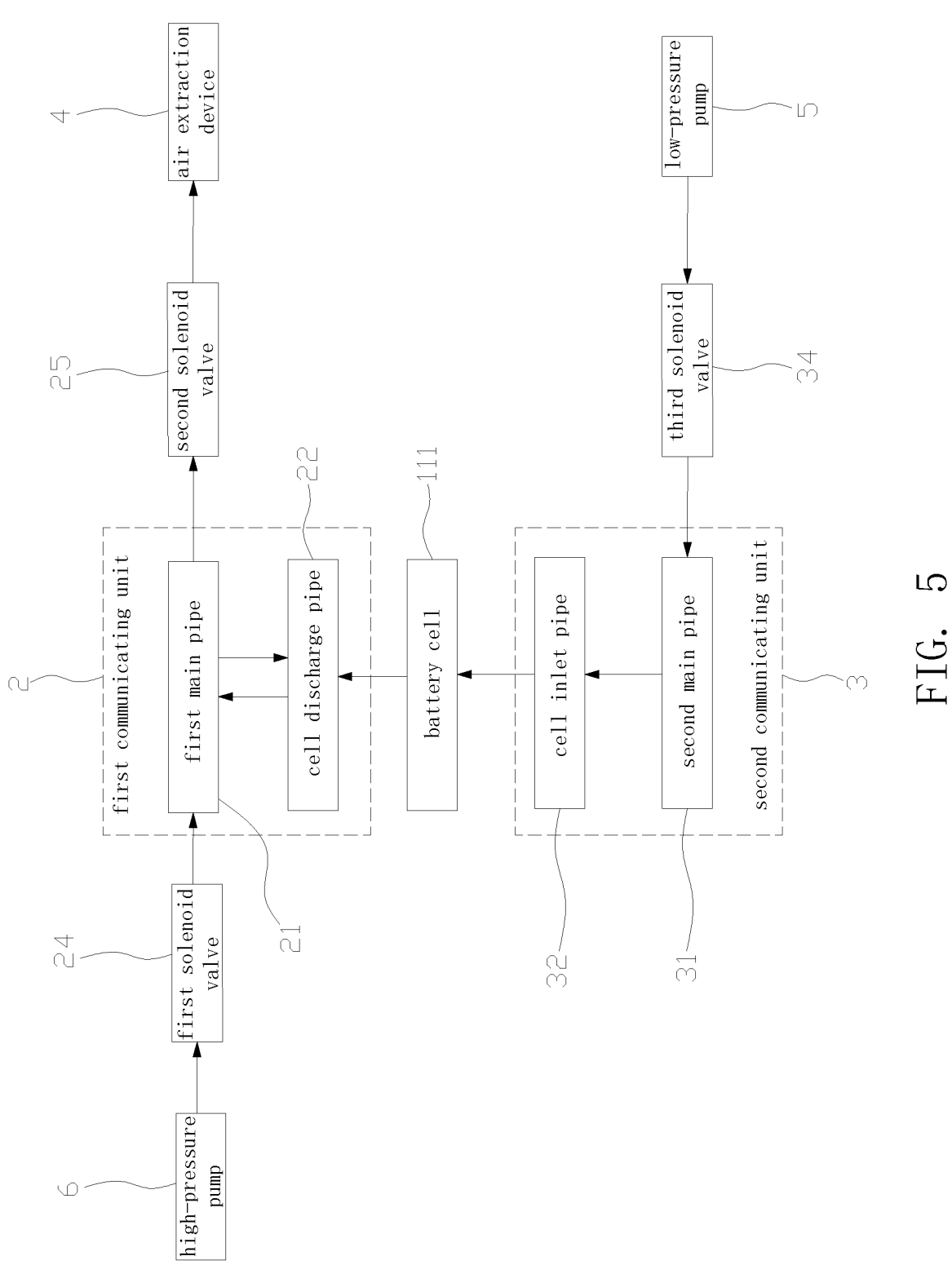
FIG. 5 is a block diagram of the energy storage battery system in FIG. 1.

As shown in FIG. 1 and FIG. 5, in an embodiment, the high-pressure pump 6 is connected with one end of the first main pipe 21. A first solenoid valve 24 is arranged at the end of the first main pipe 21 adjacent to the high-pressure pump 6. The air extraction device 4 is connected with the other end of the first main pipe 21. A second solenoid valve 25 is arranged at the end of the first main pipe 21 adjacent to the air extraction device 4.

As shown in FIG. 1 and FIG. 2, in an embodiment, a fire hood 12 and a pressure relief valve 112 are arranged above the battery cell 111. The fire hood 12 is made of high-temperature resistant material, and the fire hood 12 covers the cell discharge pipe 22 and the pressure relief valve 112.

Specifically, when the thermal runaway occurs in the battery cell 111, the electrolyte gas and/or flame generated in the battery cell 111 are ejected from the pressure relief valve 112 on the battery cell 111. At this time, the fire hood 12 can control the electrolyte gas and flame to be ejected orderly within the area where the fire hood 12 is located, so as to prevent the electrolyte gas and flame from spreading around and affecting the surrounding parts or battery cells 111, and avoid the expansion of thermal runaway. At the same time, after the cell discharge pipe 22 bursts, the cooling fluid quickly flows out through the breaking hole on the cell discharge pipe 22 and sprays outward. At this time, the fire hood 12 can control the direction of the cooling fluid, so that the cooling fluid can be continuously sprayed downward from the top of the battery cell 111, and the whole battery cell 111 can be cooled more effectively from the outside of the battery cell 111.

Figure 4:
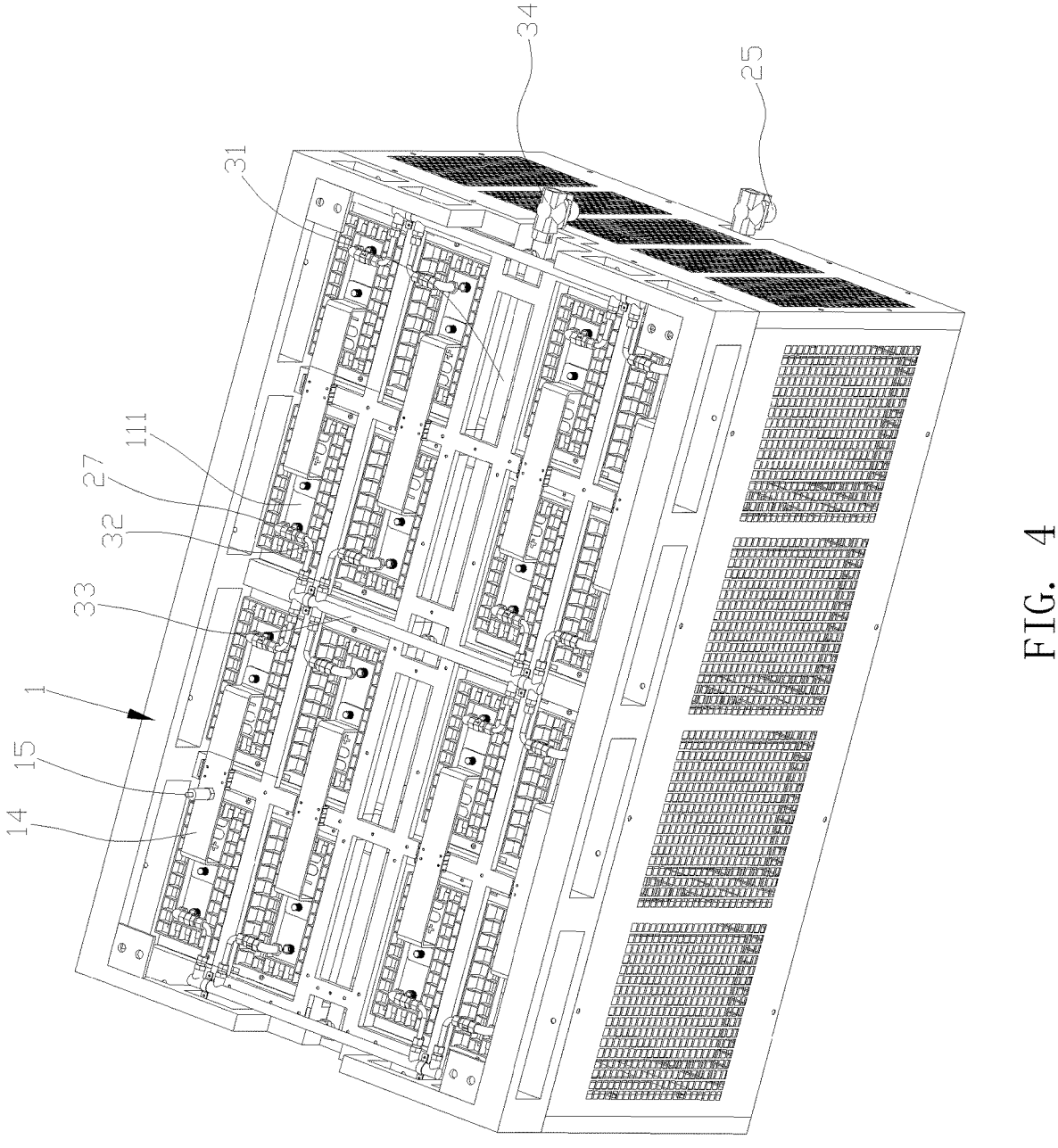
FIG. 4 is a bottom view of FIG. 1.

As shown in FIG. 4, in an embodiment, the second communicating unit 3 includes a second main pipe 31 and a cell inlet pipe 32. The second main pipe 31 is used to connect with the low-pressure pump 5, and the battery cell 111 is communicated with the second main pipe 31 through the cell inlet pipe 32. When the first level of thermal runaway occurs in the battery cell 111, the low-pressure pump 5 injects cooling fluid into the battery cell 111 through the second main pipe 31 and the cell inlet pipe 32 in sequence to continuously cool the battery cell 111.

As shown in FIG. 4, in an embodiment, the low-pressure pump 5 is connected with one end of the second main pipe 31. A third solenoid valve 34 is arranged at the end of the second main pipe 31 adjacent to the low-pressure pump 5.

As shown in FIGS. 1 to 4, in an embodiment, the first main pipe 21 and the cell discharge pipe 22 are both arranged on the top of the battery cell 111, and the cell discharge pipe 22 is communicated with the top of the battery cell 111. The second main pipe 31 and the cell inlet pipe 32 are both arranged on the bottom of the battery cell 111, and the cell inlet pipe 32 is communicated with the bottom of the battery cell 111.

In an embodiment, at least a portion of the cell inlet pipe 32 is a hose, and/or at least a portion of the cell discharge pipe 22 is a hose. By setting the cell inlet pipe 32 and the cell discharge pipe 22 as hoses, the installation and layout of the pipe can be facilitated; and at the same time, setting the cell discharge pipe 22 as a hose can also facilitate the bursting of the cell discharge pipe 22. The pressure provided by the low-pressure pump 5 is not greater than the upper limit of the normal use pressure of the cell inlet pipe 32, so that the cell inlet pipe 32 can maintain normal operation.

Figure 3:
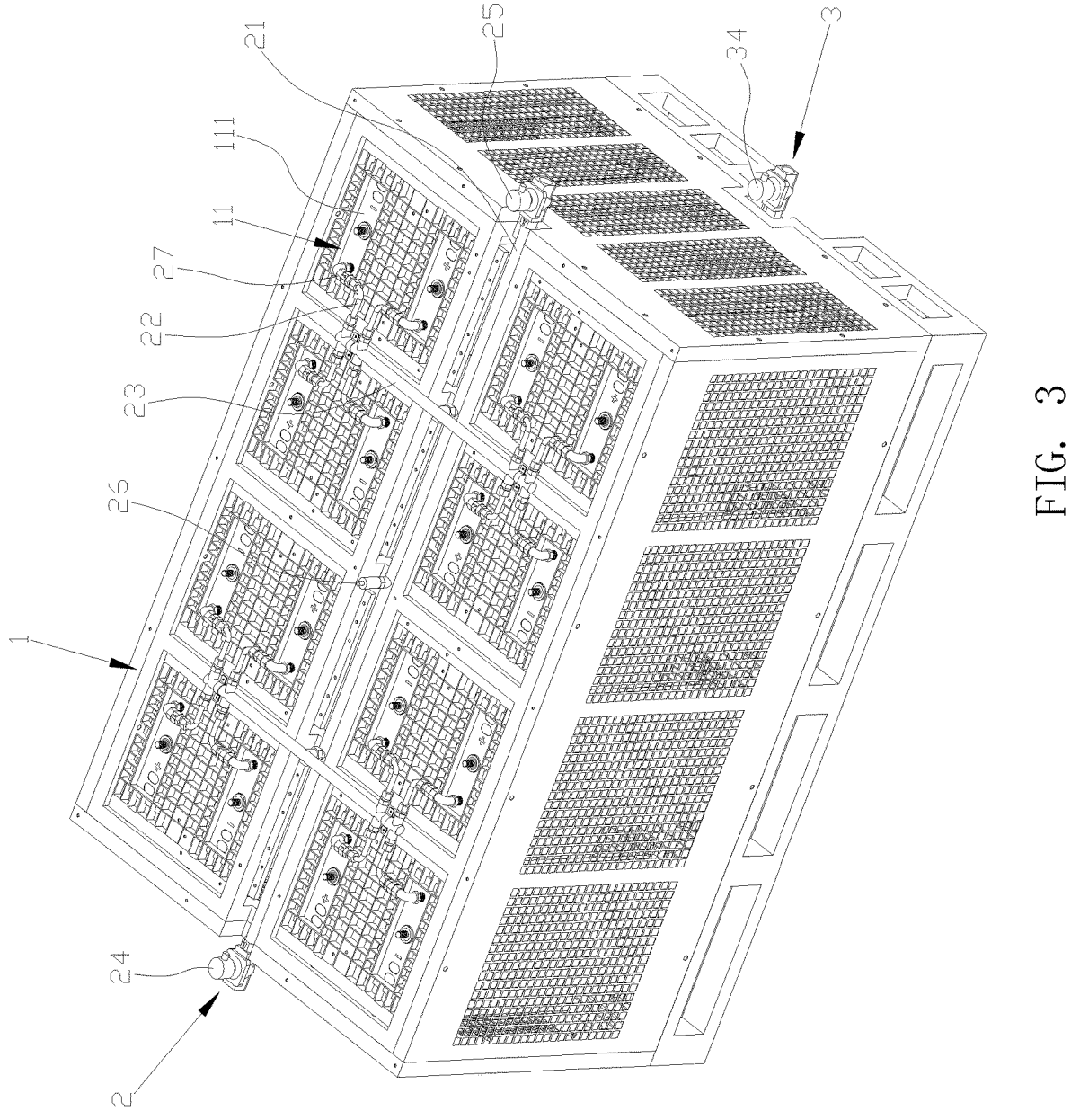
FIG. 3 is a schematic view showing the layout structure of the first communicating unit in FIG. 1.

As shown in FIG. 3 and FIG. 4, in an embodiment, a one-way valve 27 is arranged on the cell inlet pipe 32 and/or the cell discharge pipe 22.

Specifically, the one-way valve 27 is used to control the unidirectional flow of gas/liquid. The one-way valve 27 on the cell inlet pipe 32 only allows gas or liquid to flow into the battery cell 111 via the lower pipeline (i.e., the second main pipe 31 and the cell inlet pipe 32), and does not allow reverse flow. The one-way valve 27 on the cell discharge pipe 22 only allows gas or liquid inside the battery cell 111 to flow outward, and does not allow reverse flow. Therefore, when the second level of thermal runaway occurs in the battery cell 111, the cooling fluid in the cell discharge pipe 22 cannot be injected into the battery cell 111, and the cooling fluid delivered by the high-pressure pump 6 only flows to the broken cell discharge pipe 22 and is sprayed outward for cooling the outside of the whole battery cell 111; at the same time, the lower pipeline is not broken and functions well, the low-pressure pump 5 continuously injects cooling fluid into the battery cell 111 through the lower pipeline, that is, the cooling fluid inside the battery cell 111 coming from the low-pressure pump 5 flows upward from the bottom of the battery cell 111, and the cooling fluid outside the battery cell 111 coming from the high-pressure pump 6 is sprayed downward from the top of the battery cell 111, so as to achieve the purpose of cooling the inner and outer sides of the battery cell 111 simultaneously.

In one embodiment, the one-way valve 27 is a one-way solenoid valve, which can be automatically opened according to pressure, so that the opening and closing of each one-way solenoid valve can be accurately controlled separately, so as to accurately control the battery cell 111 that has occurred thermal runaway. Of course, in other embodiments, the one-way valve 27 may also be an ordinary one-way valve for cost considerations.

As shown in FIG. 3 and FIG. 4, in an embodiment, each battery module 11 includes a plurality of battery cells 111. The first communicating unit 2 and the second communicating unit 3 are communicated with each battery cell 111, that is, each battery cell 111 is communicated with a cell inlet pipe 32 and a cell discharge pipe 22. Therefore, when any one of the battery cells 111 has occurred the thermal runaway, the battery cell 111 with the thermal runaway can be cooled and controlled. The first communicating unit 2 further includes a first branch pipe 23, and the second communicating unit 3 further includes a second branch pipe 33. The cell discharge pipes 22 on the plurality of battery cells 111 are first summarized to the first branch pipe 23 and then communicated to the first main pipe 21 through the first branch pipe 23, and the cell inlet pipes 32 on the plurality of battery cells 111 are first summarized to the second branch pipe 33 and then communicated to the second main pipe 31 through the second branch pipe 33.

As shown in FIG. 1, FIG. 3 and FIG. 4, in an embodiment, the first main pipe 21 is provided with a pressure sensor 26, which is used to detect the pressure in the first main pipe 21. The top of the battery cluster 1 is provided with a composite sensor 13, which integrates the detection functions of smoke, temperature, hydrogen (H2), carbon monoxide (CO) and electrolyte gas, and is used for fire detection. The leaked gas after the thermal runaway of the battery cell can be detected by the composite sensor 13 in time. The battery cluster 1 further includes a busbar 14 (for example, a copper bar) connected to the battery cells 111. The busbar 14 is used for the electrical connection between adjacent battery cells 111, and the busbar 14 is provided with a temperature sensor 15.

Specifically, when the battery works normally, the first solenoid valve 24 and the second solenoid valve 25 are closed, the pressure in the first main pipe 21 remains constant or fluctuates slightly within the normal range, and the temperature of the busbar 14 also fluctuates normally during charging and discharging. When the pressure sensor 26 detects that the pressure and/or the rate of pressure rise in the first main pipe 21 reaches a preset value, and the temperature sensor 15 detects that the temperature and/or the rate of temperature rise of the busbar 14 reaches a preset value, it is considered that the first level of thermal runaway has occurred in the battery cell 111 that is connected to the busbar 14. When the thermal runaway of the battery cell 111 continues to expand, the cell discharge pipe 22 will be damaged first, and the gas inside the battery cell 111 will be emitted outward through the broken cell discharge pipe 22 and/or the pressure relief valve 112; when the leaked gas is detected by the composite sensor 13, at this time, it is considered that the second level of thermal runaway has occurred in the battery cell 111.

As shown in FIG. 1, in an embodiment, the top of battery cluster 1 is provided with two composite sensors 13, which are distributed in the middle of the battery cluster 1, so as to monitor the gas leaked everywhere in the battery cluster 1 in real time.

The workflow of the energy storage battery system in this embodiment is as follows:

(1). when the battery cell 111 does not occur the thermal runaway, the first solenoid valve 24, the second solenoid valve 25, the third solenoid valve 34, the air extraction device 4, the low-pressure pump 5 and the high-pressure pump 6 are closed, and there is a constant pressure cooling fluid (such as cooling water) in the pipeline between the high-pressure pump 6 and the first solenoid valve 24 and the pipeline between the low-pressure pump 5 and the third solenoid valve 34.

(2). In the initial stage of thermal runaway of the battery cell 111, the temperature in the battery cell 111 rises, and a large amount of gas is generated and flows into the first main pipe 21. The pressure sensor 26 on the first main pipe 21 detects that the pressure and/or the rate of pressure rise in the first main pipe 21 reaches the preset value, and the temperature sensor 15 on the busbar 14 detects that the temperature and/or the rate of temperature rise of the busbar 14 reaches the preset value, the processor accordingly determines that thermal runaway (first level of thermal runaway) occurs in the battery cell 111. At this time, the first solenoid valve 24 and the high-pressure pump 6 remain closed, the third solenoid valve 34 is opened, and the low-pressure pump 5 is started, so that the low-pressure pump 5 injects cooling fluid into the battery cell 111 through the second communicating unit 3 to continuously cool the battery cell 111. Further, at this time, the second solenoid valve 25 may also be opened, and the air extraction device 4 is started, so that the air extraction device 4 quickly extracts the gas in the battery cell 111 and the first communicating unit 2 out of the pipeline, so as to reduce the pressure and the concentration of combustible gas in the battery cell 111 and the pipeline.

(3). If the thermal runaway of the battery cell 111 continues to occur, when the composite sensor 13 detects gas generated by the thermal runaway of the battery cell 111, it indicates that the pressure relief valve 112 on the battery cell 111 is opened, the gas or flame leaks out, and the fire hood 12 controls the leaked gas or the ejected flame within a small area. At this time, the second solenoid valve 25 and the air extraction device 4 are closed, the third solenoid valve 34 and the low-pressure pump 5 remain opened, and the first solenoid valve 24 and the high-pressure pump 6 are opened. The low-pressure pump 5 injects cooling fluid into the battery cell 111 through the second communicating unit 3 to continuously cool the battery cell 111; at the same time, the high-pressure pump 6 pressurizes the cooling fluid and transmits it to the cell discharge pipe 22 through the first main pipe 21, such that the pressure of the cooling fluid in the cell discharge pipe 22 is greater than the bursting pressure of the cell discharge pipe 22, the cell discharge pipe 22 bursts and the cooling fluid is sprayed to the battery cell 111, and the fire hood 12 controls the direction of the cooling fluid sprayed from the cell discharge pipe 22, so that the cooling fluid is sprayed downward from the top of the battery cell 111.

Another embodiment of the disclosure further provides a control method of battery thermal runaway applied to an energy storage battery system. The energy storage battery system includes at least one battery cell 111, a first communicating unit 2 and a second communicating unit 3, the first communicating unit 2 and the second communicating unit 3 are both communicated with the battery cell 111; the first communicating unit 2 is connected with a high-pressure pump 6, and the second communicating unit 3 is connected with a low-pressure pump 5. The control method includes:

when the first level of thermal runaway occurs in the battery cell 111, opening the low-pressure pump 5, using the low-pressure pump 5 to inject cooling fluid into the battery cell 111 through the second communicating unit 3;

when the second level of thermal runaway occurs in the battery cell 111, opening the high-pressure pump 6 and the low-pressure pump 5, using the high-pressure pump 6 to pressurize external cooling fluid and transmit it to the first communicating unit 2 to cause the first communicating unit 2 to burst, and spray the cooling fluid to the battery cell 111 after the first communicating unit 2 bursts, and simultaneously, using the low-pressure pump 5 to inject cooling fluid into the battery cell 111 through the second communicating unit 3.

In an embodiment, the first communicating unit 2 includes a first main pipe 21 and a cell discharge pipe 22, the battery cell 111 is communicated with the first main pipe 21 through the cell discharge pipe 22, and one end of the first main pipe 21 is connected with the high-pressure pump 6;

when the second level of thermal runaway occurs in the battery cell 111, using the high-pressure pump 6 to pressurize the cooling fluid and transmit it to the cell discharge pipe 22 through the first main pipe 21 such that the pressure of the cooling fluid in the cell discharge pipe 22 is greater than the bursting pressure of the cell discharge pipe 22, and the cell discharge pipe 22 sprays the cooling fluid to the battery cell 111 after the cell discharge pipe 22 bursts.

In an embodiment, the battery cluster 1 further includes a busbar 14 connected to the battery cell 111, the busbar 14 is provided with a temperature sensor 15, the first main pipe 21 is provided with a pressure sensor 26, and the top of the battery cluster 1 is provided with a composite sensor 13;

when the pressure sensor 26 detects that the pressure and/or the rate of pressure rise in the first main pipe 21 reaches a preset value, and the temperature sensor 15 detects that the temperature and/or the rate of temperature rise of the busbar 14 reaches a preset value, it is considered that the first level of thermal runaway has occurred in the battery cell 111;

when the composite sensor 13 detects gas generated by the thermal runaway of the battery cell 111, it is considered that the second level of thermal runaway has occurred in the battery cell 111.

In an embodiment, a fire hood 12 and a pressure relief valve 112 are arranged above the battery cell 111, the first communicating unit 2 is arranged on the top of the battery cell 111, and the fire hood 12 covers the first communicating unit 2 and the pressure relief valve 112. The control method further includes:

when the second level of thermal runaway occurs in the battery cell 111, using the fire hood 12 to control the leaked gas or the ejected flame of the battery cell 111 within the area where the fire hood 12 is located, and using the fire hood 12 to control the direction of the cooling fluid sprayed by the first communicating unit 2, such that the cooling fluid flows downward from the top of the battery cell 111.

The advantages of the energy storage battery system and the control method of battery thermal runaway provided by the embodiment of the disclosure include:

(1). The energy storage battery system can carry out hierarchical monitoring and hierarchical treatments of thermal runaway, identify the first level of thermal runaway through the monitoring of the pressure sensor 26 and the temperature sensor 15, identify the second level of thermal runaway through the monitoring of the composite sensor 13, and take different measures according to the different degrees of thermal runaway. In the early stage of the thermal runaway, when the battery smoke and flame do not leak, the thermal runaway can be detected to quickly intervene to control the thermal runaway, so as to control the thermal runaway more quickly and efficiently.

(2). The energy storage battery system is equipped with a variety of thermal runaway control devices and pipelines. The cooling fluid can be injected into the interior of the battery cell 111 for cooling, and the cooling fluid can also be sprayed to the exterior of the battery cell 111 for cooling, thereby improving the cooling efficiency. Further, the combustible gas generated by thermal runaway can be quickly discharged through the pipeline to reduce the risk of fire. Through a variety of ways to jointly control thermal runaway, it has high efficiency and good reliability.

(3). In the energy storage battery system, the individual battery cell 111 is directly connected with the cooling fluid pipeline. When the individual battery cell 111 has occurred thermal runaway, the temperature of the individual battery cell 111 can be controlled to prevent expansion of the thermal runaway, and avoid the chain reaction to cause greater losses. Furthermore, the individual battery cell 111 and the individual battery cluster 1 can be controlled and processed without affecting other battery cells 111 and other battery clusters 1, resulting in small consequences and low cost.

The above is only the specific embodiments of the present disclosure, but the protection scope of the present disclosure is not limited to this. Any person skilled in the technical field can easily think of changes or replacements within the technical scope disclosed by the present disclosure, which should be covered by the protection scope of the present disclosure. Therefore, the protection scope of the present disclosure shall be defined by the appended claims.

What is claimed is:

1. An energy storage battery system comprising a battery cluster and a first communicating unit, the battery cluster comprising at least one battery module, the battery module comprising at least one battery cell, wherein the first communicating unit is configured to connect with a high-pressure pump, and external cooling fluid is capable of being pressurized by the high-pressure pump and transmitted to the first communicating unit to cause the first communicating unit to burst, and after the first communicating unit bursts, the cooling fluid is sprayed to the battery cell;

the energy storage battery system further comprises a second communicating unit, the first communicating unit and the second communicating unit are both communicated with the battery cell; the second communicating unit is configured to connect with a low-pressure pump, and external cooling fluid is capable of being transmitted to an interior of the battery cell using the low-pressure pump.

2. The energy storage battery system according to claim 1, wherein the first communicating unit is arranged on a top of the battery cell, and the first communicating unit is communicated with the top of the battery cell; the second communicating unit is arranged on a bottom of the battery cell, and the second communicating unit is communicated with the bottom of the battery cell.

3. The energy storage battery system according to claim 1, wherein the first communicating unit comprises a first main pipe and a cell discharge pipe, the first main pipe is configured to connect with the high-pressure pump, and the battery cell is communicated with the first main pipe through the cell discharge pipe; a pressurizing pressure of the high-pressure pump is greater than a bursting pressure of the cell discharge pipe, and the external cooling fluid is capable of being pressurized through the high-pressure pump and transmitted to the cell discharge pipe through the first main pipe to cause the cell discharge pipe to burst, and the cooling fluid is sprayed to the battery cell after the cell discharge pipe bursts.

4. The energy storage battery system according to claim 3, wherein a pressure resistant performance of the cell discharge pipe decreases with an increase of temperature of the cell discharge pipe.

5. The energy storage battery system according to claim 3, wherein the high-pressure pump is connected with one end of the first main pipe.

6. The energy storage battery system according to claim 3, wherein the first main pipe is provided with a pressure sensor.

7. The energy storage battery system according to claim 3, wherein a fire hood and a pressure relief valve are arranged above the battery cell, and the fire hood covers the cell discharge pipe and the pressure relief valve.

8. The energy storage battery system according to claim 3, wherein the second communicating unit comprises a second main pipe and a cell inlet pipe, the second main pipe is configured to connect with the low-pressure pump, and the battery cell is communicated with the second main pipe through the cell inlet pipe.

9. The energy storage battery system according to claim 8, wherein the low-pressure pump is connected with one end of the second main pipe.

10. The energy storage battery system according to claim 8, wherein the first main pipe and the cell discharge pipe are both arranged on a top of the battery cell, and the cell discharge pipe is communicated with the top of the battery cell; the second main pipe and the cell inlet pipe are both arranged on a bottom of the battery cell, and the cell inlet pipe is communicated with the bottom of the battery cell.

11. The energy storage battery system according to claim 8, wherein at least a portion of the cell inlet pipe is a hose, and/or at least a portion of the cell discharge pipe is a hose.

12. The energy storage battery system according to claim 8, wherein a one-way valve is arranged on the cell inlet pipe and/or the cell discharge pipe.

13. The energy storage battery system according to claim 8, wherein the battery module comprises a plurality of battery cells; the first communicating unit further comprises a first branch pipe, and the second communicating unit further comprises a second branch pipe; the cell discharge pipes on the plurality of battery cells are first summarized to the first branch pipe and then communicated to the first main pipe through the first branch pipe, the cell inlet pipes on the plurality of battery cells are first summarized to the second branch pipe and then communicated to the second main pipe through the second branch pipe.

14. The energy storage battery system according to claim 1, wherein a composite sensor is arranged on a top of the battery cluster.

15. The energy storage battery system according to claim 1, wherein the battery cluster further comprises a busbar connected with the battery cell, and the busbar is provided with a temperature sensor.

* * * * *